April 29, 1952  C. B. LIVERS ET AL  2,594,664
HYDRAULIC CONTROL VALVE WITH AUTOMATIC HOLD AND RELEASE
Filed Oct. 31, 1949  2 SHEETS—SHEET 1

INVENTORS
AND C. B. LIVERS
A. A. MEDDOCK
BY
ATTORNEY

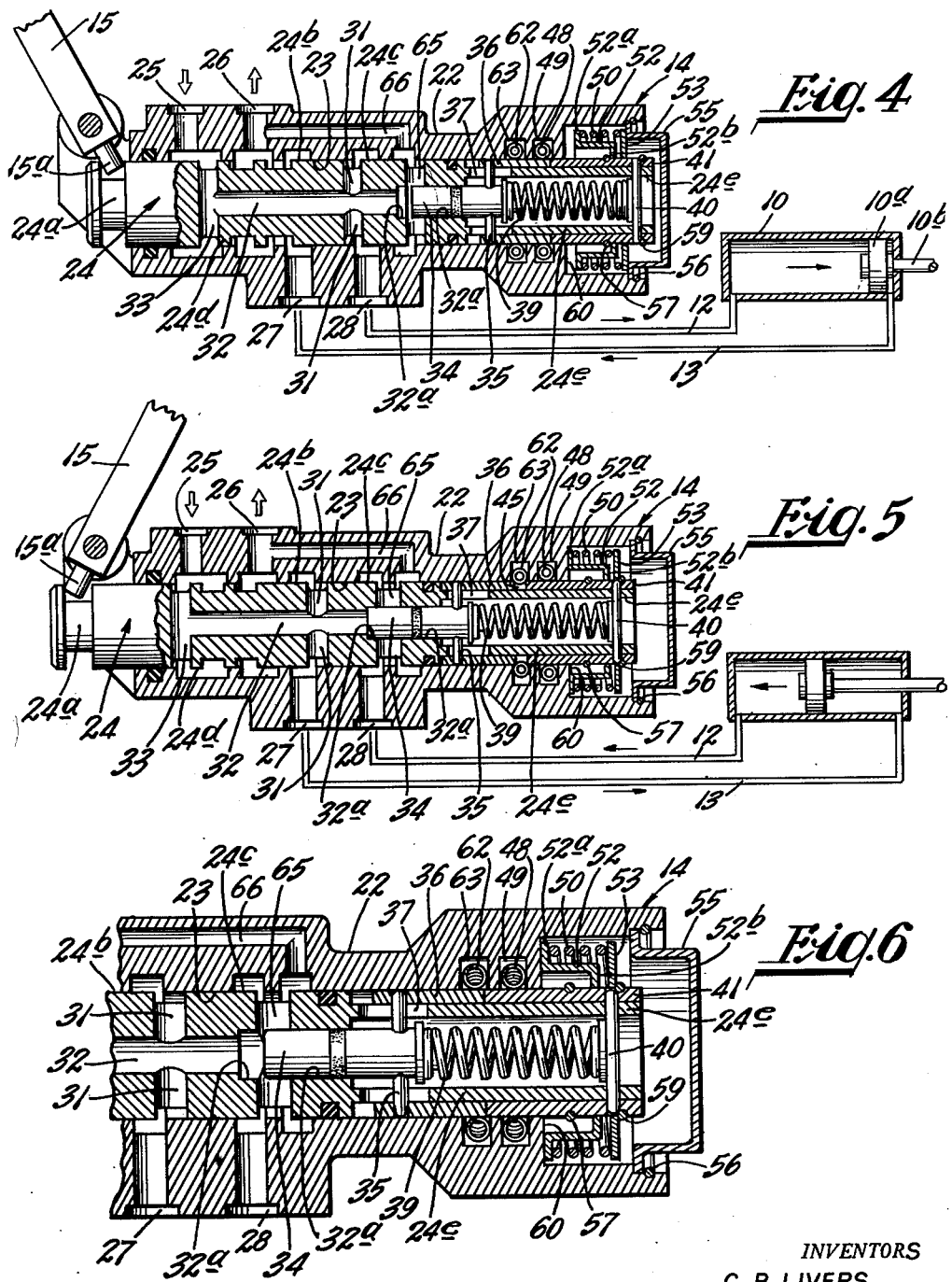

Patented Apr. 29, 1952

2,594,664

UNITED STATES PATENT OFFICE 2,594,664

HYDRAULIC CONTROL VALVE WITH AUTOMATIC HOLD AND RELEASE

Carlos B. Livers, North Hollywood, and Alvin A. Meddock, Van Nuys, Calif., assignors to Bendix Aviation Corporation, South Bend, Ind., a corporation of Delaware Application October 31, 1949, Serial No. 124,711

10 Claims. (Cl. 121—46.5)

1

This invention relates to a valve for hydraulic systems in which a motor is actuated by fluid flow controlled by the valve.

An object of the invention is to provide a practicable and desirable control valve for a hydraulic motor which, when manually actuated out of neutral position to supply actuating fluid to the motor, will hold in the actuated position until the motor has completed its movement, and will then automatically return to neutral position.

Another object is to provide a valve having automatic hold and release that does not reduce the fluid pressure effective on the motor.

A feature of the invention is a valve of simple and effective design that is held open mechanically and is restored by hydraulic pressure at completion of the motor movement.

Other more specific objects and features of the invention will become apparent from the description to follow:

The present valve has a closed or neutral position in which fluid is cut off from the motor controlled thereby, and one or more open positions in which fluid is supplied to the motor to actuate it in one direction or the other. A restoring spring constantly urges the valve into neutral position, but there is provided a detent capable of holding the valve in open position after it has been moved there manually. In addition, there is a pressure-responsive detent-disabling mechanism that disables the detent and thereby permits the restoring spring to move the valve back to neutral when the pressure in the valve rises as a result of the motor having completed its movement.

An important feature of the invention is a simple mechanism responsive to pressure that not only releases the detent but relieves excessive pressure in the system, thereby functioning as a relief valve.

In the drawing:

Figs. 2, 3, 4 and 5 are longitudinal sectional views through the valve, showing different stages of operation thereof; and Fig. 6 is a longitudinal sectional view through the right end portion of the valve, showing still another stage in the operation thereof.

Figure 1:
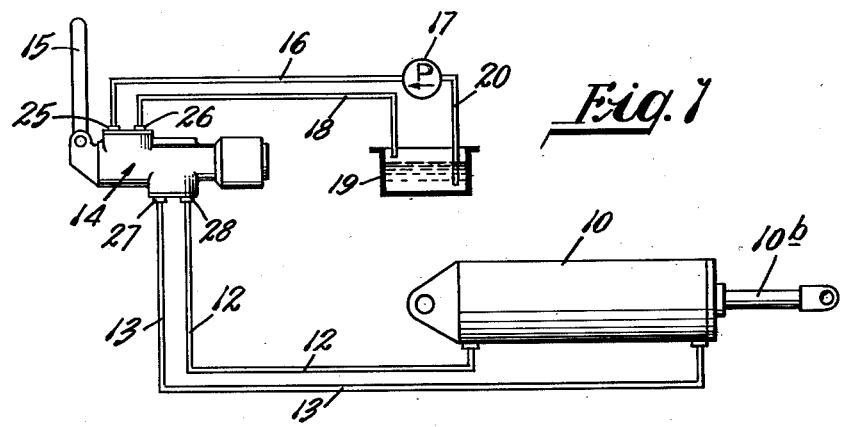
Fig. 1 is a schematic diagram of a hydraulic system incorporating a valve in accordance with the present invention.

Referring to Fig. 1, the hydraulic system therein depicted comprises a motor cylinder 10 containing a piston 10a connected to a piston rod 10b which projects from the cylinder and is connected to any device to be operated by the motor. The cylinder 10 has fluid ports at its opposite ends, connected by fluid lines 12 and 13 respectively to motor ports 27 and 28 in a control valve

2

14 which constitutes the present invention. The valve 14 has an actuating handle 15 and has a pair of ports 25 and 26, one of which, 25, is an inlet port and is connected by a line 16 to the output of a pump 17, and the other of which, 26, is an outlet port and is connected by a line 18 to a fluid supply reservoir 19. The intake of the pump 17 is connected by a line 20 to the reservoir 19.

Figure 2:
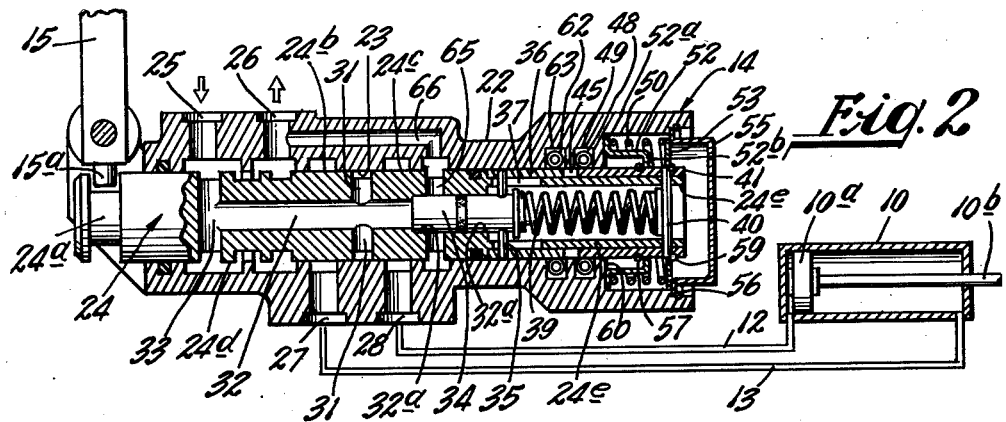

Referring to Fig. 2, the valve 14 comprises a body member 22 having a bore 23 cooperating with a movable member consisting of a piston 24 which functions to interconnect the ports in the body in a desired manner in different positions of the piston. The valve piston 24 extends out of the left end of the body 22, and is shown as having an annular groove 24a which is engaged by a pin 15a on the lower end of the handle 15, for manual actuation of the piston by the handle.

Fig. 2 shows the valve in neutral position in which the inlet port 25 is directly connected to the outlet port 26, so that fluid supplied to the inlet port 25 by the pump circulates freely through the valve and out of the outlet port 26, without developing pressure. At the same time, lands 24b and 24c of the valve piston 24 block the motor ports 27 and 28, to prevent escape of fluid from either end of the motor cylinder 10 and thereby hold it in whatever position it has been operated into.

Figure 3:
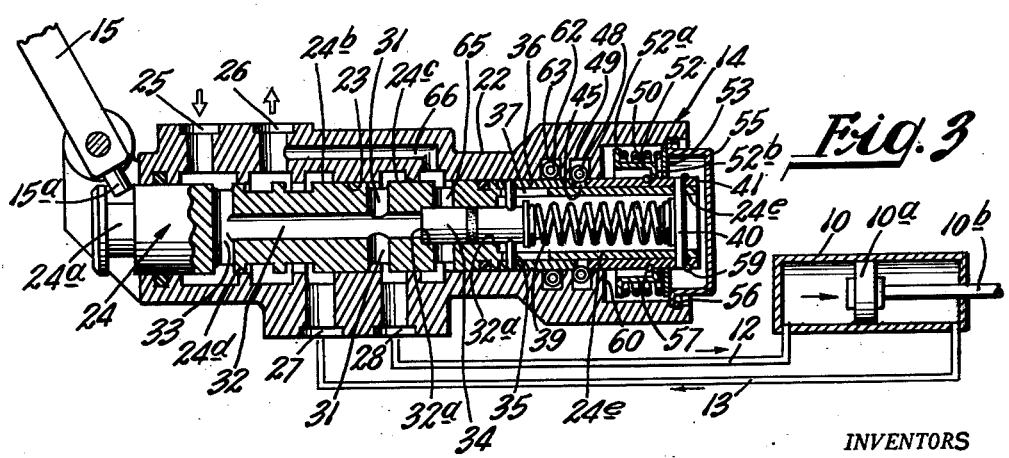

Now let it be assumed that the handle 15 is rocked to the left, as shown in Fig. 3. This moves a land 24d on the valve piston 24 into blocking relation between the inlet and outlet ports 25 and 26 respectively, so that the pumped fluid is no longer freely bypassed. However, this movement of the valve piston carries the land 24c clear of the motor port 28, so that the latter is communicated through radial passages 31, a longitudinal passage 32, and radial passages 33 in the piston 24, with the inlet port 25, permitting fluid to flow through the motor line 12 into the left end of the motor cylinder 10 and move the piston therein to the right. At the same time, fluid is exhausted from the right end of the motor cylinder 10 through the motor line 13 into the motor port 27 of the valve 24 and thence through the return port 26 back to the reservoir. During movement of the motor piston 10, it is restrained only by the resistance of the load to which the piston rod 10b is connected, and the pressure in the valve will be less than a predetermined maximum.

The valve piston 24, after being moved into the open position shown in Fig. 3, is yieldably held open by a detent means, so that the operator does not have to hold the handle 15 while the motor piston 10a is going through its movement. This detent means will now be described.

Referring to Fig. 2, a spring-closed relief valve 34 normally closes the right end of the longitudinal passage 32 in the piston 24. This valve 34, as shown, is cylindrical in shape and is slideable in a bore 32a in the valve piston, the bore 32a constituting an enlarged extension of the longitudinal passage 32.

The valve 34 projects to the right beyond the end of the bore 32a, and is connected by a transverse pin 35 to a sleeve 36 (shown most clearly in the large scale view of Fig. 6) that is slideable in the right end of the bore 23 in the valve body. The valve piston 24 has an integral sleeve 24e extending from the right end thereof, this sleeve being of smaller diameter and telescoping with the sleeve 36 which is attached to the relief valve 34 for movement therewith. Slots 37 are provided in the sleeve 24e through which the pins 35 extend so that the sleeve 36 and the relief valve 34 can move relative to the sleeve 24e. The relief valve 34 is normally held in closed position (as shown in Figs. 2 and 3) by a helical compression spring 39 compressed between the right end of the valve 34 and a pin 40 which extends through the sleeve 24e and through a sleeve 41 that surrounds it, the sleeve 41 being of the same outer diameter as the sleeve 36.

As shown in Fig. 2, when the valve 34 is in normal, closed, position, the two sleeves 36 and 41 are slightly separated to define a gap 45 therebetween. When the valve piston 34 is moved to the right, as shown in Fig. 3, the sleeves 36 and 41 move therewith as a unit, carrying the gap 45 into registration with an annular detent spring 48 positioned in an annular groove 49 in the body 22. The spring 48 thereupon snaps into the gap 45 and holds the valve piston in operative position against the restoring force of a centering spring 50.

The centering spring 50 consists of a helical compression spring compressed between a flange 52a on a collar 52 and a washer 53 that is slideable on the sleeve 41, and that normally rests against the edge of an end closure cap 55 which is secured in a counterbore in the right end of the body 22 by an annular, split retainer spring 56. The collar 52 has an inwardly extending flange 52b which slides on the sleeve 41, and is limited in its sliding movement by an annular, split spring ring 57 mounted in an annular groove in the outer surface of the sleeve 41. The centering spring 50 urges the valve piston toward neutral position whenever it is displaced therefrom in either direction. Thus, as shown in Fig. 3, the internal flange 52b on the collar 52 bears against the ring 57 on the sleeve 41 thereby urging the sleeve 41, the sleeve 24e and the valve piston 24 to the left. When the piston is displaced out of neutral position to the left, as shown in Fig. 5, the washer 53 is carried by a retaining ring 59 on the sleeve 41 to the left thereby compressing the centering spring 50, the left end of the collar 52 at that time bottoming against the shoulder 60 in the valve body.

The annular helical detent spring 48 retains the valve piston in right hand position while the motor is moving, so that the operator can release the handle 15 immediately after shifting it, and the valve piston will automatically return to neutral when the motor piston 10a has completed its movement to the right. Thus, as shown in Fig. 4, when the piston 10a bottoms against the right end of the motor cylinder, fluid flow is stopped, and the pressure immediately rises in the inlet port 25 and the valve piston passage 32 to the predetermined value which is sufficient to overcome the spring 39 and open the relief valve 34 to discharge fluid through radial ports 65 into a body passage 66 leading back to the return port 26. The opening movement of this valve carries the connected sleeve 36 to the right, closing the gap between it and the sleeve 41, and in doing so, displaces the annular detent spring 48 out of the gap. Since thereafter the detent spring 48 simply bears against the smooth cylindrical surface formed by the abutting sleeves 36 and 41, it is unable to retain the valve piston in right-hand position and the latter is moved back to the neutral position shown in Fig. 2 by the centering spring 50. This movement of the valve piston reconnects the pressure port 25 directly to the return port 26, releasing the pressure of the fluid, whereupon the relief valve 34 closes, and the corresponding movement of the sleeve 36 away from the sleeve 41 restores the gap 45.

When the valve piston 24 is moved to the left, as shown in Fig. 5, it is retained in actuated position by a second annular detent spring 62 positioned in a second annular groove 63 in the valve body 22, which spring is then juxta-positioned to the gap 45 between the sleeves 36 and 41. When the motor piston 10a has completed its movement and bottoms in the left end of the motor cylinder, the pressure in the valve passage 32 again rises to the predetermined high value necessary to open the relief valve 34, and the opening of the valve again moves the sleeve 36 into contact with the sleeve 41, eliminating the gap between the sleeves so that the detent spring 62 is disabled as to its holding function, and the centering spring 50 again restores the valve piston to neutral position.

To insure that the relief valve 34 will open a sufficient distance to close the gap 45 between the sleeves 36 and 41, the bore 32a at the right end of the passage 32 is extended beyond the radial ports 65, the valve 34 sealing with the bore 32a, so that no appreciable fluid can be discharged to relieve the pressure until the valve 34 has opened sufficiently to close the gap 45.

It is to be noted that during movement of the motor piston 10a, the pressure fluid is applied through fully opened channels in the valve to the motor cylinder so that there is no appreciable pressure drop, and the full pump pressure is effective against the motor piston. Likewise, the exhaust passages through the valve connecting the other end of the motor cylinder to the return port 26 are fully opened so that there is no back pressure. This feature is not found in prior known self-holding valves in which a pressure drop produced by flow of fluid through the valve is utilized to hold the valve in open position until the motor has completed its stroke.

Although for the purpose of explaining the invention, a particular embodiment thereof has been shown and described, obvious modifications will occur to a person skilled in the art, and I do not desire to be limited to the exact details shown and described.

We claim:

1. A valve of the type described comprising: a body member having inlet and outlet ports and a motor port, and a movable member movable in the body member between a neutral and an actuated position, said body and movable members having cooperating passages and surfaces for connecting said inlet port to said motor port in the actuated position, and for disconnecting said inlet and outlet ports from said motor port in said neutral position; restoring means yieldably urging said movable member toward said neutral position; detent means normally effective to hold said movable member in actuated position against the force of said restoring means; and pressure-responsive means responsive to pressure exceeding a predetermined pressure in said inlet port for disabling said detent means to permit return of said movable member to neutral by said restoring means, said detent means comprising a spring detent on one of said members and a pair of relatively movable elements on the other member, said elements being normally separated to provide therebetween a gap engageable by said detent in said actuated position of said movable member, said elements being moved toward each other into abutting relation to eliminate said gap by actuation of said pressure responsive means.

2. A valve according to claim 1 in which said pressure-responsive means comprises a relief valve connected between said inlet and outlet ports for by-passing fluid therebetween in response to rise of the pressure in said inlet port above said predetermined pressure.

3. A valve according to claim 2 in which said relief valve comprises a cylinder and a piston sealing therewith; spring means for urging said piston into one end of said cylinder, and relief ports in said cylinder spaced from said one end thereof and connected to said return port whereby said piston must be moved sufficiently to uncover said relief ports before pressure in said inlet port can be relieved.

4. A valve according to claim 1 in which said spring detent is in said body member, said relatively movable elements and said pressure-responsive means are on said movable member, and said pressure-responsive means comprises: a passage in said movable member connected to said inlet port, piston means in said passage responsive to pressure therein, and means connecting said piston means to one of said movable elements.

5. A valve according to claim 4 in which said body member defines a chamber in which said movable member is reciprocable; an extension on one end of said movable member on which said one of said pair of relatively movable elements is slidably supported for movement between closed and separated positions with respect to the other of said elements, said other element being secured to said extension for movement therewith.

6. A valve according to claim 5 in which said chamber is cylindrical and said relatively movable elements consist of cylindrical sleeves slideable within said chamber into and out of abutting engagement with each other.

7. A valve according to claim 6 in which said spring detent comprises an annular helical tension spring surrounding said cylindrical elements, said body member having an annular groove in the wall of said cylindrical chamber in which said detent spring is confined against longitudinal movement.

8. A valve according to claim 1 in which said pressure-responsive means comprises a relief valve in one end of said movable member; a tubular extension on said one end of said movable member extending beyond said relief valve; a relief valve spring within said tubular extension, and means for compressing it against said relief valve; said movable elements comprising a pair of sleeves mounted on said tubular extension, one secured thereto and the other being slideable thereon into and out of abutting relation thereto and being connected to said relief valve for movement thereby into said abutting relation in response to opening of the relief valve, and into gapping relation to said one sleeve when the relief valve closes, said spring detent being in said body member and positioned to engage the gap between said sleeves when said relief valve is closed and said movable member is in actuated position.

9. A valve of the type described comprising: a body member having inlet and outlet ports and a pair of motor ports, and a movable member movable in the body member between neutral and actuated positions, said body and movable members having cooperating passages and surfaces for connecting said inlet port to one of said motor ports and connecting the other motor port to said outlet port in one actuated position, for disconnecting said inlet and outlet ports from said motor ports in said neutral position, and for connecting said inlet port to the other said motor port and connecting said one motor port to said outlet port in the other actuated position; restoring means yieldably urging said movable member toward said neutral position; detent means normally effective to hold said movable member in either actuated position against the force of said restoring means; and pressure-responsive means responsive to pressure exceeding a predetermined pressure in said inlet port for disabling said detent means to permit return of said movable member to movable position by said restoring means, said detent means comprising a pair of longitudinally spaced spring detents on one of said members and a pair of relatively movable elements on the other member, said elements being normally separated to provide therebetween a gap engageable by one of said spring detents in one actuated position and to be engaged by the other said detent by the other actuated position of said movable member, said elements being moved toward each other into abutting relation to eliminate said gap by actuation of said pressure responsive means.

10. A valve according to claim 9 in which said spring detents are in said body member, said relatively movable elements and said pressure responsive means are on said movable member, and said pressure responsive means comprises: a passage in said movable member connected to said inlet port, piston means in said passage responsive to pressure therein, and means connecting said piston means to one of said movable elements.

CARLOS B. LIVERS.
ALVIN A. MEDDOCK.

REFERENCES CITED

The following references are of record in the file of this patent:

UNITED STATES PATENTS

| Number | Name | Date |
| --- | --- | --- |
| 2,184,793 | Clench | Dec. 26, 1939 |
| 2,243,364 | Trautman | May 27, 1941 |
| 2,427,567 | Martin | Sept. 16, 1947 |
| 2,451,730 | Greenlee | Oct. 19, 1948 |
| 2,480,527 | Wachter | Aug. 30, 1949 |
| 2,532,552 | Jirsa | Dec. 5, 1950 |